United States Patent [19]

Sakane

[11] Patent Number: 4,932,284
[45] Date of Patent: Jun. 12, 1990

[54] STEERING WHEEL

[75] Inventor: Katsunobu Sakane, Ichinomiya, Japan

[73] Assignee: Toyoda Gosei Co., Ltd., Nishikasugai, Japan

[21] Appl. No.: 380,030

[22] Filed: Jul. 14, 1989

[30] Foreign Application Priority Data

Jul. 23, 1988 [JP] Japan .............................. 63-97808[U]

[51] Int. Cl.⁵ .............................................. B62D 1/04
[52] U.S. Cl. ....................................... 74/552; 280/750
[58] Field of Search ....................... 74/552, 558.5, 558;
280/750, 777, 778; 200/61.54, 61.56; 29/159 B

[56] References Cited

U.S. PATENT DOCUMENTS

| | | | |
|---|---|---|---|
| 3,977,271 | 8/1976 | Becker | 74/558.5 X |
| 4,606,240 | 8/1986 | Sakane | 74/552 |
| 4,628,761 | 12/1986 | Niwa | 74/552 |
| 4,771,147 | 9/1988 | Buma | 200/61.54 |
| 4,790,209 | 12/1988 | Ishida | 280/750 X |

FOREIGN PATENT DOCUMENTS 58-156453  9/1983  Japan .

Primary Examiner—Vinh T. Luong
Attorney, Agent, or Firm—Cushman, Darby & Cushman

[57] ABSTRACT

A steering wheel for an automobile including a impact energy absorber, a retainer, a bottom plate, a mounting portion and a clip disposed on a boss plate of the steering wheel body. The clip is engaged with the front edge of a boss plate, and the mounting portion with a boss plate of the steering wheel body. The clip is made of spring steel and formed in L-like shape, and fixed to the retainer extended from the bottom plate along a front wall of the energy absorber by means of burring caulking. Consequently, labor is not required for the machining of the clips, and the fixing position of the clip to the bottom plate may be taken arbitrarily, and further the mounting stability of the clip is made high.

5 Claims, 5 Drawing Sheets 4,932,284

STEERING WHEEL

BACKGROUND OF THE INVENTION

1. Field of the Invention

The present invention relates to a steering wheel of automobiles, and more specifically to improvement of structure where a pad is installed to a boss plate of the steering wheel body.

2. Description of the Prior Art

A steering wheel as an example in the prior art will be described based on FIGS. 1 and 2. FIG. 1 is a plan view of a steering wheel body SW installed on a pad, and FIG. 2 is a sectional view taken in line II—II of FIG. 1. The mounting structure of the pad 1 to the steering wheel body SW is in that an assembling structure body 10 installed within the pad 1 is mounted to a boss plate 30.

The assembling structure body 10 comprises an energy absorber 11 of sheet metal, a bottom plate 13 of steel fixed to the bottom surface of the energy absorber 11, and a clip 14 extended integrally from the front edge of the bottom plate 13.

On the other hand, the boss plate 30 of the steering wheel body SW is welded on the upper end of a boss 32. The boss 32 is arranged on the upper end of a steering shaft 31 and fixed by a nut 33. A tapped hole 35 is provided on the rear edge (the left edge in the figure) of the boss plate 30.

The clip 14 is engaged with the front edge (the right edge in the figure) of the boss plate 30, and the tapped hole 35 is made coincident with a tapped hole at the rear edge of the bottom plate 13 and a screw 37 is tightened to both tapped holes, thereby the assembling structure body 10 and the pad 1 connected to the assembling structure body 10 are mounted on the boss plate 30 so as to construct the steering wheel (refer to Japanese Patent Application Laid-open Publication No. Sho 58-156453).

SUMMARY OF THE INVENTION

In recent years, in order to facilitate the assembling of the assembling structure body 10 with the boss plate 30 and to improve the stability after the assembling, it has been proposed that the clip 14 is made of spring steel.

In the above-mentioned construction, however, the clip 14 and the bottom plate 13 are integral. Consequently, when the clip 14 is made of spring steel, the bottom plate 13 must be also made of spring steel and use of the expensive spring steel at large quantity results in increase of the cost.

Therefore as shown in FIG. 3, it has been proposed that the bottom plate 13 and the clip 15 are formed separately from each other so as to reduce the use quantity of the expensive spring steel.

In this case, the clip 15 as shown in FIG. 4 comprises a fixed portion 17, and a pair of boss plate holding portions 19 extended from the fixed portion 17 and bent in the U-like shape. The fixed portion 17 is fixed at both fixing margins 25, 27 to the rear surface of the bottom plate 13 by rivets 21, 23.

In the above-mentioned mounting structure of the pad of the steering wheel, however, the two rivets 21, 23 are used to fix the fixed portion 17 of the clip 15 to the bottom plate 13, thereby small parts are required at the large number and the assembling is troublesome. Consequently, from the viewpoint of reduction of the number of parts and the easy assembling, it is preferable to eliminate the rivets 21, 23. Therefore, burring caulking may be performed in place of the riveting.

The burring caulking in this case means as shown in FIG. 5 that a part of the bottom plate 13 is cut and raised into cylindrical shape and a cylindrical portion 14 is formed (burring machining), and on the other hand the fixed portion 17 is provided with a through hole 18 in which the cylindrical portion 14 is inserted, and the top end of the cylindrical portion 14 is subjected to plastic deformation so as to widen the diameter, thereby the bottom plate 13 and the fixed portion 17 are fixed.

The burring caulking is effective in that two members are overlaid and combined, but it is not preferable in that three members are overlaid and combined because the intermediate member cannot be held. Also in order to secure the mounting stability of the clip 15 to the bottom plate 13, the burring caulking position at the fixed portion 17 is preferably made position where the boss plate holding portion 19 is extended. If this is possible, the fixing margins 25, 27 on both ends of the fixed portion 17 become unnecessary and the clip is made small in size and light in weight.

However, in the position where the boss plate holding portion 19 is extended, since the boss plate holding portion 19 being folded back becomes an obstacle, a jig for the burring caulking cannot be used thereby the burring caulking cannot be performed.

Also since the boss plate holding portion 19 in the clip 15 of spring steel is bent in U-like shape, i.e., two times, this machining is troublesome.

An object of the invention is to provide a steering wheel wherein a clip only is made of spring steel and can be formed by the bending machinig of one time, and it can be fixed by burring caulking.

Another object of the invention is to provide a steering wheel wherein the mounting stability of a clip to a bottom plate is improved.

Still another object of the invention is to provide a steering wheel wherein a clip is made small in size and light in weight.

In order to attain the foregoing objects, in a steering wheel of the invention, a retainer is extended from a bottom plate along an energy absorber, and an L-shaped clip of spring steel is fixed to the retainer by means of burring caulking. The clip is composed of a fixed portion to be burring caulked to the retainer, and a boss plate holding portion extended from the fixed portion. The clip is preferably constructed in that the extended part of the boss plate holding portion in the fixed portion is burring caulked to the retainer. The clip is also preferably constructed in that the fixed portion is of band plate shape and the boss plate holding portions are extended from both ends of the fixed portion.

DESCRIPTION OF THE PREFERRED EMBODIMENT

Figure 1:
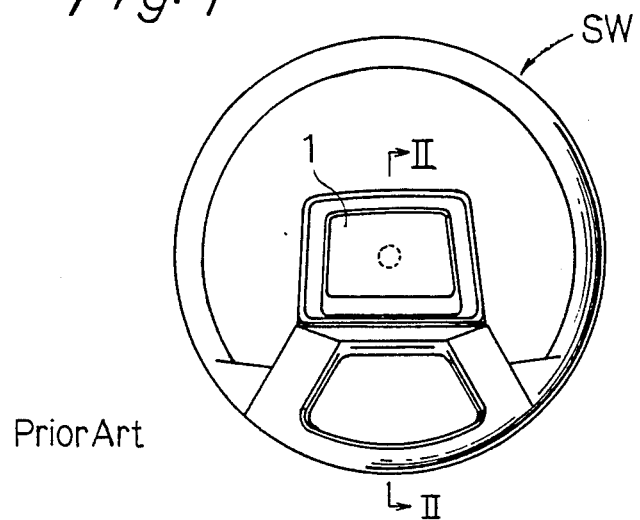
FIG. 1 is a plan view of a steering wheel in the prior art.
Figure 2:
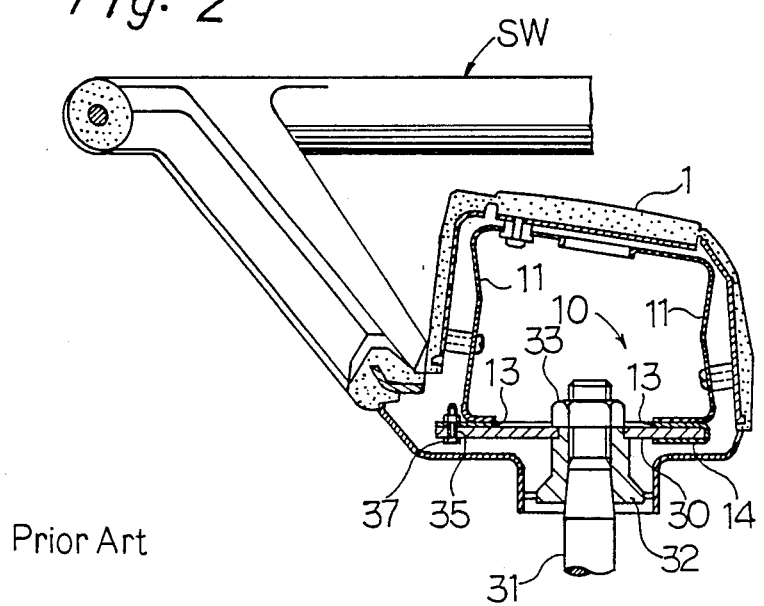
FIG. 2 is a sectional view illustrating mounting structure of a pad in the prior art (sectional view taken on line II—II in FIG. 1)
Figure 3:
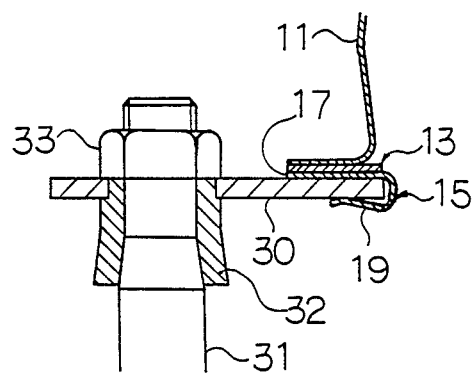
FIG. 3 is a partly sectional view of a clip separate from a bottom plate in the investigation proposal.

An embodiment of the invention will now be described.

The same parts as those described in the prior art are designated by the same reference numerals, and the description shall be partially omitted.

Figure 6:
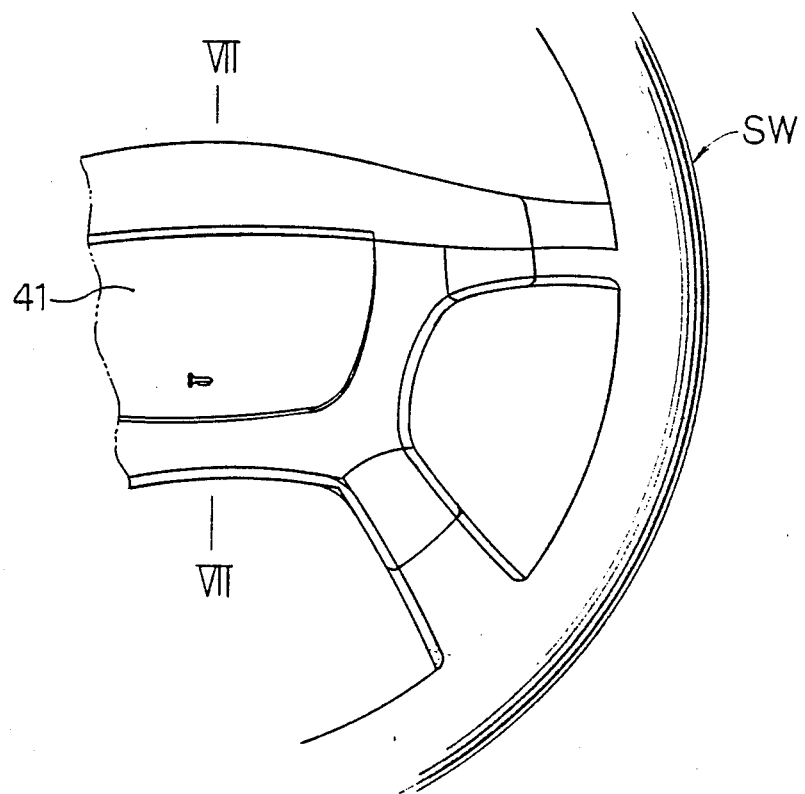
FIG. 6 is a fragmentary plan view of a steering wheel in the invention.
Figure 7:
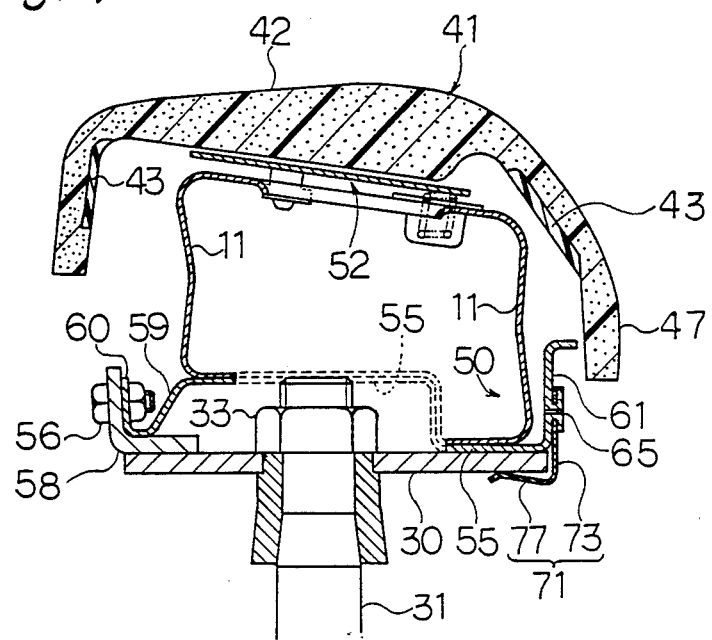
FIG. 7 is a sectional view illustrating mounting structure of a pad in an embodiment of the invention (sectional view taken on line VII-VII in FIG. 6)
Figure 8:
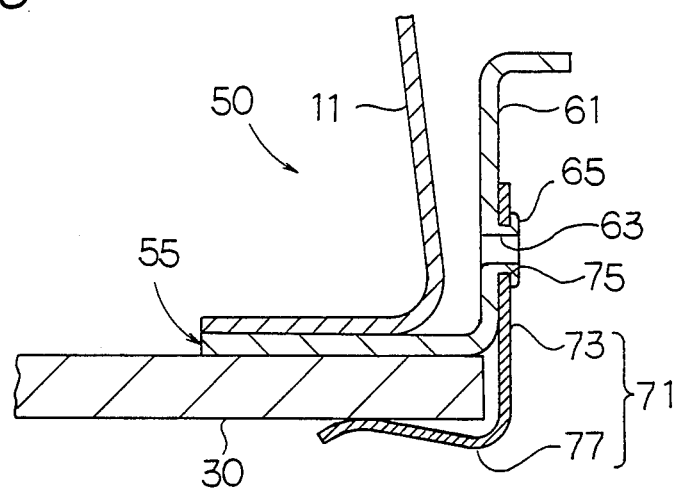
FIG. 8 is a partly enlarged view of FIG. 7 illustrating engaged state between a clip and a boss plate in the embodiment.

Mounting structure of a pad in a steering wheel of the embodiment is shown in FIG. 7. The mounting structure of the pad 41 is in that an assembling body 50 installed within the pad 41 is mounted on a boss plate 30. A partial plane of the steering wheel of the embodiment is shown in FIG. 6.

The pad 41 is made of a soft polymer (such as formed polyurethane). A core member 43 of a polyamide to improve shape holding property of the pad 41 is embedded in periphery of a portion 42 deformed as a pushing member of a horn switch. The pad 41 is held by a bracket (not shown) extended from a bottom plate 55, and an energy absorber 11 is arranged in the inside thereof.

The assembling structure body 50 is composed of the energy absorber 11, the bottom plate 55 and a clip 71. The energy absorber 11 is a metal plate of carbon steel bent into box-like shape, and several slits are formed in the longitudinal direction on the side plate of the enregy absorber 11. The energy absorber 11 is subjected to plastic deformation in flat shape so as to absorb impact load applied thereto. A switching unit 52 of the horn switch is arranged on the upper surface of the energy absorber 11.

Figure 9:
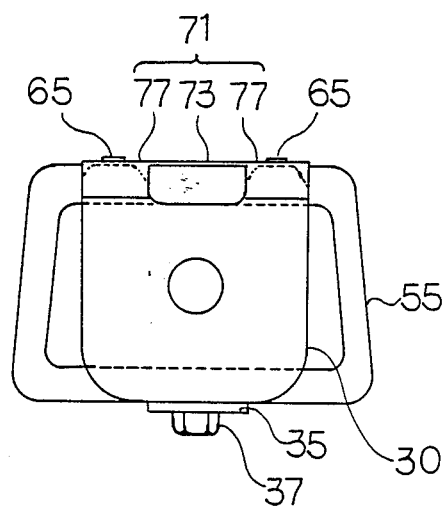
FIG. 9 is a bottom view illustrating mounting structure of the pad in the embodiment.

The bottom plate 55 is made of a carbon steel plate, and is formed in square shape along the lower surface of the energy absorber 11 (refer to FIG. 9). The bottom plate 55 is fixed to the lower surface of the energy absorber 11.

A mounting portion 59 is extended from the rear edge of the bottom plate 55 and bent in V-like shape. A nut 60 is previously welded and fixed to the mounting portion 59. The mounting portion 59 is overlaid with a rear mounting portion 58 provided on the rear side of the boss plate 30, and is mounted by a bolt 56.

A retainer 61 is extended from the front edge of the bottom plate 55 and bent upward along the energy absorber 11. Two cylindrical portion 63 for burring caulking are formed halfway up the retainer 61. The top end of the retainer 61 attains to the vicinity of the rear surface of the front wall 47 of the pad 41, and can abut on the rear surface of the front wall 47 so that the front wall 47 is prevented from being deformed at random.

The clip 71 of spring steel is composed of a fixed portion 73 of band plate shape, and a pair of boss plate holding portions 77 extended from the longitudinal side of the fixed portion 73 (refer to FIG. 9). The fixed portion 73 and each boss plate holding portion 77 are formed in L-like shpae (refer to FIG>8). The clip 71 is formed from a spring steel plate in that each boss plate holding portion 77 is bent in L-like shape, i.e., by bending machining of one time vertically. A through hole 75 corresponding to the outer diameter of the cylindrical portion 63 of the retainer 61 is bored on a portion from which the boss plate holding portion 77 is extended in the fixed portion 73. The cylindrical portion 63 is inserted in the through hole 75 and subjected to burring caulking. Numeral 65 in the figure designates a plastic deformed portion by the burring caulking. When the fixed portion 73 is fixed to the retainer 61, the distance between the boss plate holding portion 77 and the lower surface of the bottom plate 55 is formed smaller than the thickness of the boss plate 30.

Although the pair of boss plate holding portions 77 are installed in the embodiment, the number is not particularly limited. However, the boss plate holding portions 77 preferably hold at least both end portions of the front edge of the boss plate 30.

Figure 4:
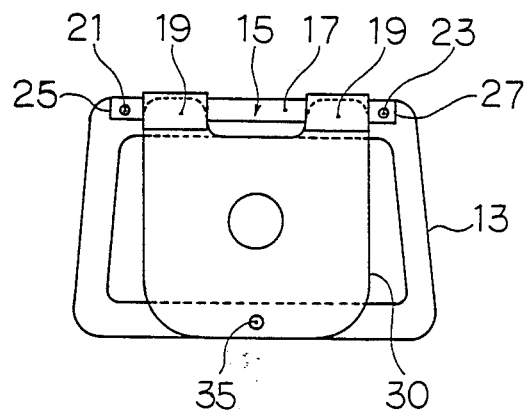
FIG. 4 is a bottom view of the clip in the investigation proposal.
Figure 5:
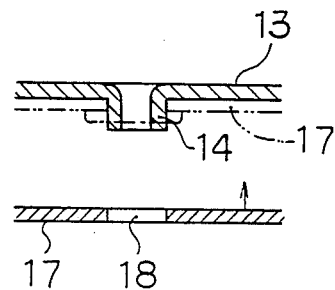
FIG. 5 is a sectional view illustrating burring caulking.

Since the burring caulking is performed in the open space being the outside of the retainer 61, the burring caulking can be performed without presence of a member to obstruct the caulking jig and the degree of freedom in the fixing positions of both members is increased. In the embodiment, the burring caulking is performed in the position from which each boss plate holding portion 77 is extended in the fixed portion 73 (refer to FIG. 9). Consequently, the fixing margins (numerals 25, 27 in FIG. 4) need not be provided on both ends of the fixed portion 73.

This means also that the setting position of the boss plate 77 can be shifted towards both ends of the bottom plate 55. If the distance of each boss plate holding portion 77 is widened, the mounting stability of the assembling structure body to the boss plate is increased.

The boss plate 30 is the same as that in the prior art.

The front edge of the boss plate 30 is grasped by the clip 71 and the lower surface of the bottom plate 55, and the mounting portion 59 of the bottom plate 55 is fixed to the rear mounting portion 58, thereby the assembling structure body 50 hence the pad 41 can be mounted on the boss plate 30. In this case, screwing method using the bolt 56 and the nut 60 is adopted as the fixing mode. Of course, other method (such as riveting) may be used. Also the rear edge of the bottom plate 55 may be fixedly directly to the boss plate 30.

What is claimed is:

1. A steering wheel comprising:
  (a) a boss connected to a steering shaft;
  (b) a boss plate connected to said boss;
  (c) a bottom plate overlaid on said boss plate;
  (d) an energy absorber arranged on said bottom plate;
  (e) a pad arranged on the upper side of said energy absorber so as to cover said energy absorber and said bottom plate;
  (f) a retainer extended from the front edge of said bottom plate along the front wall of said energy absorber;
  (g) a clip of spring steel composed of a fixed portion and a boss plate holding portion into L-like shape and having distance corresponding to the thickness of said boss plate between said boss plate holding portion and said bottom plate, said fixed portion being fixed to said retainer by means of burring caulking, said clip being engaged with the front edge of said boss plate; and
  (h) a mounting portion formed on the rear edge of said bottom plate, after engaging said clip with the front edge of said boss plate, said mounting portion being combined with the rear edge of said boss plate for fixing said pad.

2. A steering wheel as set forth in claim 1, wherein said clip is composed of a fixed portion of band plate shape, and a pair of boss plate holding portions extended from the longitudinal edge of said fixed portion and bent vertically.

3. A steering wheel as set forth in claim 2, wherein said clip is extended from both ends of the longitudinal edge of said fixed portion.

4. A steering wheel as set forth in claim 2, wherein said fixed portion is burring caulked to said retainer on a portion from which said boss plate holding portion is extended.

5. A steering wheel as set forth in claim 3, wherein said fixed portion is burring caulked to said retainer on both ends.

* * * * *